United States Patent [19]
Fullam et al.

[11] Patent Number: 5,640,635
[45] Date of Patent: Jun. 17, 1997

[54] SYSTEM AND METHOD FOR AUTOMATIC ENGAGEMENT OF A CLOSE-UP LENS IN A FIXED-FOCUS CAMERA

[75] Inventors: Scott F. Fullam, Mountain View; Eric C. Anderson, San Jose, both of Calif.

[73] Assignee: Flashpoint Technology, Inc., San Jose, Calif.

[21] Appl. No.: 547,248

[22] Filed: Oct. 24, 1995

Related U.S. Application Data

[63] Continuation-in-part of Ser. No. 296,354, Aug. 25, 1994.
[51] Int. Cl.⁶ .................................................. G03B 1/18
[52] U.S. Cl. ........................................ 396/402; 396/77
[58] Field of Search .......................... 354/195.12, 409, 354/162, 195.1, 288, 289.11, 289.12, 289.1, 404; 348/356, 346; 396/72, 73, 75, 77

[56] References Cited

U.S. PATENT DOCUMENTS

| | | | |
|---|---|---|---|
| 3,882,520 | 5/1975 | Kamp et al. | 354/197 |
| 3,903,537 | 9/1975 | Ettischer | 354/197 |
| 4,505,566 | 3/1985 | Noguchi et al. | 354/400 |
| 4,643,554 | 2/1987 | Ogawa | 354/400 |
| 4,643,555 | 2/1987 | Wakabayashi | 354/403 |
| 4,788,569 | 11/1988 | Yamada et al. | 354/409 |
| 4,872,058 | 10/1989 | Baba et al. | 358/227 |
| 4,967,279 | 10/1990 | Murashima | 358/227 |
| 5,005,038 | 4/1991 | Ogawa et al. | 354/400 |
| 5,124,739 | 6/1992 | Kelleher | 354/413 |
| 5,150,144 | 9/1992 | Soshi et al. | 354/400 |
| 5,187,516 | 2/1993 | Suzuki | 354/403 |
| 5,260,733 | 11/1993 | Kawano | 354/195.12 |
| 5,287,223 | 2/1994 | Hirasawa | 359/697 |
| 5,295,001 | 3/1994 | Takahashi | 358/482 |
| 5,322,998 | 6/1994 | Jackson | 250/216 |
| 5,325,145 | 6/1994 | Hirasawa | 354/400 |
| 5,369,436 | 11/1994 | Kawakami et al. | 348/355 |

FOREIGN PATENT DOCUMENTS 2129642  5/1984  United Kingdom ........... G03B 13/18

Primary Examiner—David M. Gray
Attorney, Agent, or Firm—Carr, DeFilippo & Ferrell

[57] ABSTRACT

A fixed-focus camera having a retractable close-up lens, fixed-focus lens, infrared filter, and optical low-pass filter disposed along an optical axis within a housing. The close-up lens is switchable between a close-up position coaxial with the optical axis and a far position not coaxial with the optical axis. Light received from a target passes through an aperture in the housing and then through the lenses and filters. An image sensor receives the filtered light and outputs a two-dimensional array signal of corresponding voltages proportional to the energy of light striking each sensing element. The voltage signal from the image sensor is filtered using a high-pass filter and the high-frequency components of the signal are measured to determine a relative focal value for the light received from the target. The close-up lens is retracted for calculating a far-position focal value and then engaged for calculating a close-up position focal value, and the calculated focal values are compared to empirically-derived constant values to determine which lens position will produce a better-focused image.

17 Claims, 4 Drawing Sheets

SYSTEM AND METHOD FOR AUTOMATIC ENGAGEMENT OF A CLOSE-UP LENS IN A FIXED-FOCUS CAMERA

CROSS REFERENCE TO RELATED APPLICATION

The present invention is a continuation-in-part of pending U.S. patent application Ser. No. 08/296,354 filed Aug. 25, 1994 by Scott F. Fullam and Eric C. Anderson, and entitled "System And Method For Detecting And Indicating Proper Focal Distance In A Fixed Lens Camera," which is hereby incorporated by reference.

BACKGROUND OF THE INVENTION

1. Field of the Invention

This invention relates generally to fixed-focus cameras and more particularly to a system and method for automatic engagement of a close-up lens in a fixed-focus camera.

2. Discussion of the Prior Art

Producing a well-focused image is a primary consideration of most camera users as well as camera manufacturers. Another important and sometimes conflicting goal is the cost of making a camera to produce such images. Fixed-focus cameras are relatively inexpensive due to their simple design, but are unable to focus on objects closer than a given focal length for the design of that fixed-focus lens. To circumvent this limitation, a retractable close-up lens with a shallow depth of field is often added to the lens assembly for photographing nearby subjects (typically one foot).

The addition of a close-up lens enables users to switch between the fixed-focus lens and the close-up lens, depending on the photographic subject's distance from the camera. The photographer can then determine which lens is likely to produce a focused image and switch to the appropriate lens. This task can sometimes be difficult as well as distracting, and must be performed for each and every picture taken to ensure consistent results. Many camera users cannot estimate distances accurately enough to effectively switch between using normal and close-up lenses. Also, the time necessary to estimate focal distance and switch to the appropriate lens may result in missed photographic opportunities. Even when a skilled user operates the camera, it is difficult to consistently produce well-focused images using a manual lens-switching system.

Previous attempts to overcome the lens-switching problem in fixed-focus cameras include active range finding schemes using infrared light or sonar to measure the distance from camera to photographic subject. The distance measurement can then be used to engage or disengage a close-up lens. Passive measurement schemes include providing lengths of cord or similar measuring devices whose lengths correspond to focal lengths of the respective lenses. The photographer may then use the measuring devices to determine proper lens configuration. These range finding schemes of the prior art add elaborate components to the camera and make the picture-taking process more complex and difficult.

Another prior art approach features an auto-focus camera with a focal-distance measuring system combined with a lens-adjusting mechanism. The adjusting mechanism automatically moves the lens through the entire range of lens focal lengths responsive to the focal distance measurement. Due to its increased complexity, the adjustable lens mechanism's cost is generally significantly higher than a comparable fixed-focus lens. Common auto focus systems are not applicable to fixed-focus cameras because a fixed-focus camera's lens is not movable or adjustable over a range of focal lengths.

Therefore, an improved system and method is needed to automatically engage and disengage a close-up lens in a fixed-focus camera, to economically permit capture of well-focused images with minimum difficulty and distraction to the camera user.

SUMMARY OF THE INVENTION

In accordance with the present invention, a system and method are disclosed for automatically engaging a close-up lens in a fixed-focus camera. In a preferred embodiment of the present invention, a retractable close-up lens, fixed-focus lens, infrared filter, and optical low-pass filter are disposed in succession, coaxially along an optical axis within a housing. The retractable close-up lens is switchable between a far position not coaxial with the optical axis, and a close-up position coaxial with the optical axis. Light reflected from a target passes through an aperture, into the housing, and then through the lenses and filters. An image sensor, such as a charge-coupled device (CCD), periodically collects image data in a two-dimensional array. The image sensor outputs the two-dimensional array of corresponding analog voltages (with the voltage at each CCD element proportional to the amount of light striking it) to an analog-to-digital (A/D) converter, which converts the analog voltages to digital sampled image data and outputs the digital array to a Central Processing Unit (CPU). The sampled image data is used to determine the relative focus of the light collected at the image sensor by calculating the high-frequency energy components of the sampled image data. Calculating the high-frequency components of a given image yields a focal value for that image.

In an alternative embodiment, an analog system rather than a digital CPU is used to process the image sensor data. The CCD image sensor outputs the two-dimensional array of corresponding analog voltages to an analog high-pass filter which eliminates low-frequency constituents of the sampled CCD image data. A peak detector is used to measure the peak magnitude of the filtered, high-frequency image data.

The present invention determines whether to engage the close-up lens using a procedure which essentially compares the far-position focal value with the close-up position focal value. The procedure may be initiated by depressing the camera's shutter release button to a middle position allowing the present invention to select the correct lens. First, a far-position focal value is calculated with the close-up lens in a disengaged position not coaxial with the optical axis. Then, if the far-position focal value is greater than or equal to an empirically-derived constant, K1, an image is captured with the lens in the far position. K1 represents a minimum acceptable focus value, below which a comparison with the close-up position focal value is warranted. If the far-position focal value is less than K1, the lens assembly is switched to the close-up position having the close-up lens engaged coaxially with the optical axis. Then, a close-up position focal value is calculated to allow comparison of the far-position focal value and the close-up position focal value. Next, a K2 value is calculated equal to the far-position focal value divided by the close-up position focal value. Then, K2 is compared to an empirically-derived constant value, K3, to determine which lens position to use. If K2 is greater than or equal to K3, then the image is captured only after switching the close-up lens to the far position. If K2 less than K3, then the image is captured while still retaining the close-up position.

DETAILED DESCRIPTION OF THE PREFERRED EMBODIMENT

Figure 1:
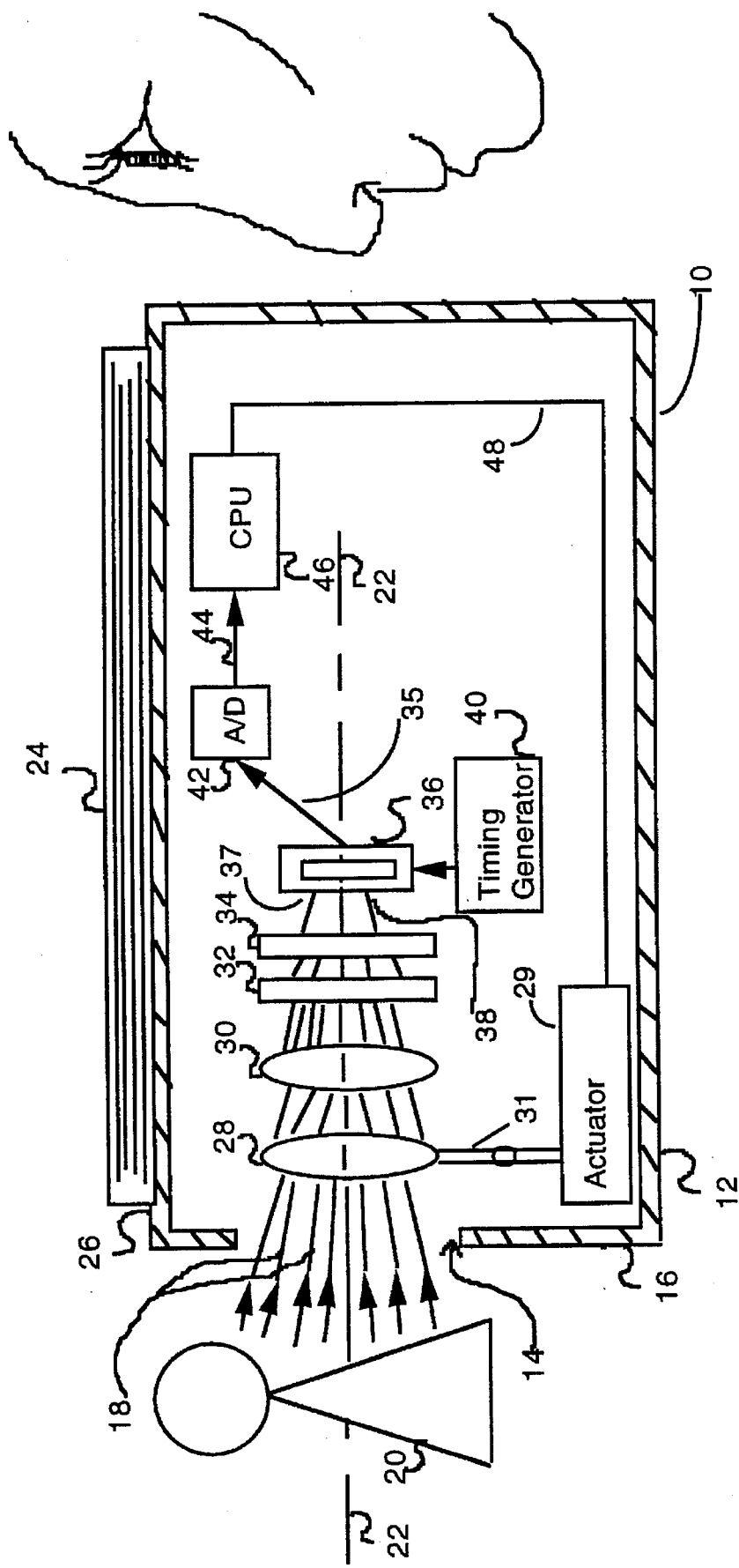
FIG. 1 is a cross-section of a fixed-focus camera in accordance with the present invention, schematically illustrating the camera's components.

FIG. 1 shows an improved system, according to the present invention, for automatically engaging a retractable "macro" or close-up lens 28 in a fixed-focus camera 10. Camera housing 12 includes aperture 14 formed in the housing's front side 16 to allow light 18 received from a subject or target 20 to pass into housing 12 along an optical axis 22. A viewfinder 24, disposed on the housing's top side 26, is used for optically viewing target 20 in order to align axis 22 with target 20.

A retractable close-up lens 28, fixed-focus lens 30, infrared filter 32 and optical low-pass filter 34 are disposed successively along optical axis 22 within housing 12. When retractable close-up lens 28 is engaged on optical axis 22, light 18 passes through retractable close-up lens 28 to fixed-focus lens 30. When retractable close-up lens 28 is disengaged and offset from optical axis 22, light 18 passes through aperture 14 and, without passing through retractable close-up lens 28, strikes fixed-focus lens 30 directly. Light 18 is then filtered through infrared filter 32, which blocks infrared light and passes visible light to optical low-pass filter 34. Optical low-pass filter 34 passes light below a selected frequency and attenuates higher frequencies to prevent aliasing associated with high-frequency light patterns.

Two-dimensional image sensor 36 is positioned on optical axis 22 to receive filtered light 38 containing image data 37 from optical low-pass filter 34. Image sensor 36 is preferably a charge-coupled device (CCD) that records image data 37 as an array of analog voltages 35. An image-sensor timing generator 40 with an internal clock periodically directs image sensor 36 to sample image data 37 corresponding to target 20. Image sensor 36 measures the luminance of filtered light 38 on a pixel-by-pixel basis, and outputs a corresponding two-dimensional array of analog voltages 35 to analog-to-digital (A/D) converter 42. A/D converter 42 converts analog voltages 35 on a pixel-by-pixel basis to digital values, and outputs a corresponding array of digital signals 44 to Central Processing Unit (CPU) 46. Signals are processed to produce a digital focal value as discussed in detail with respect to FIG. 2 below.

Figure 2:
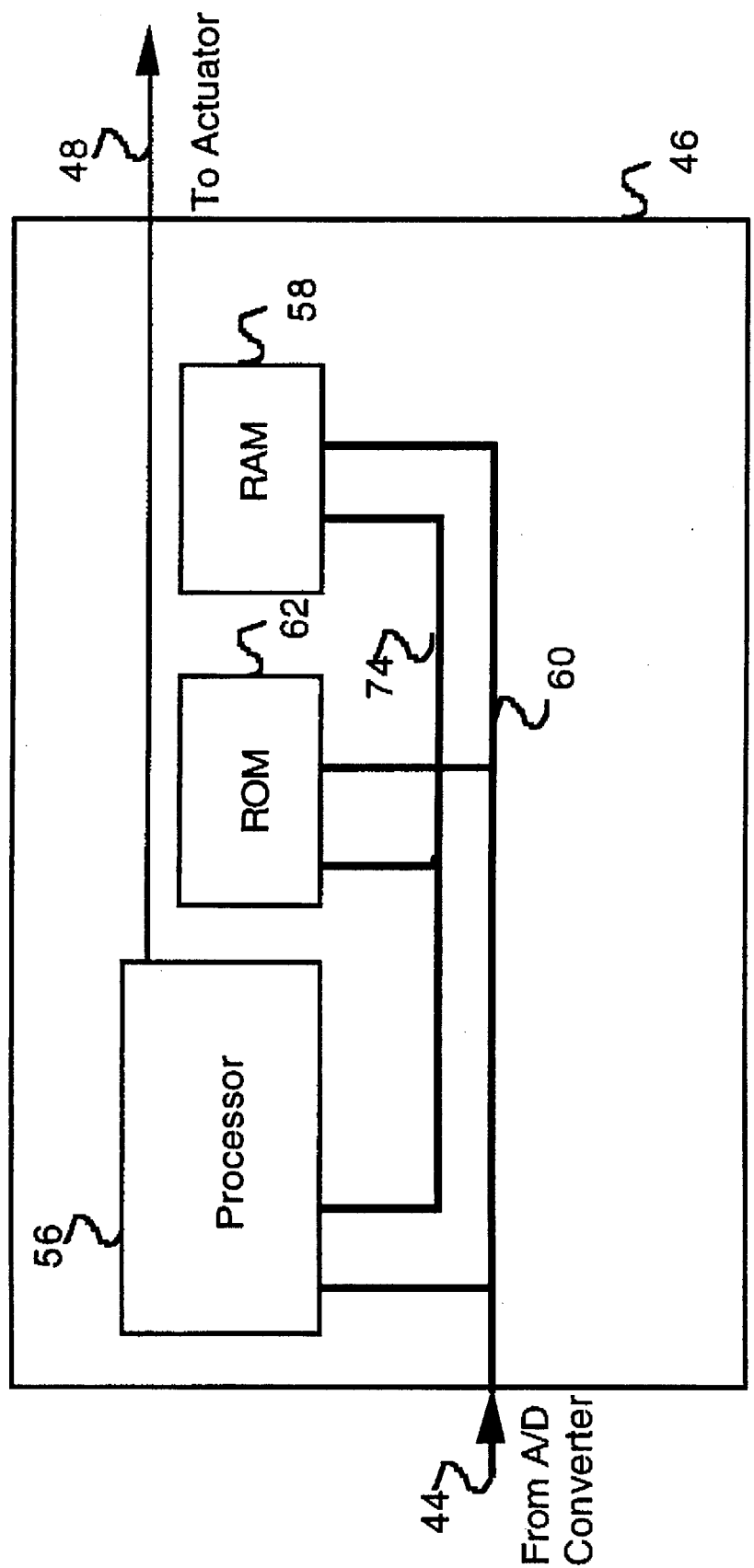
FIG. 2 is a block diagram illustrating elements of the central processing unit (CPU) of the preferred embodiment.

FIG. 2 is a block diagram illustrating elements of CPU 46 according to a preferred embodiment of the present invention. CPU 46 comprises a conventional processor 56 connected by data bus 60 and address bus 74 to memory components such as Read-Only-Memory (ROM) 62 and Random-Access-Memory (RAM) 58. The conventional processor 56 could be replaced by a finite-state machine or other digital system. Further, although the preferred embodiment uses digital processing to filter the output of image sensor 36, analog circuitry can also process the output of image sensor 36, as discussed with reference to FIG. 3.

In the preferred embodiment, ROM 62 stores a sequence of programmed steps for processor 56 to perform high-pass filtering on digital array signals 44. Digital array signals 44 imported via data bus 60 from A/D converter 42 are stored temporarily in RAM 58, which makes digital array signals 44 available to processor 56. Processor 56 communicates with ROM 62 via address bus 74, and, using data bus 60, fetches instructions for using digital array signals 44 to determine a focal value.

Optimum focus is characterized by sharp contrasts within an image. Therefore, measuring spatial high-frequency components of adjacent sample points within an image yields a measurement of relative focus. The focal value is determined by high-pass filtering to detect voltage-magnitude transitions between adjacent pixels or cells of digital array 44. Infinite impulse response (IIR) filtering is preferably used. Alternatively, finite impulse response (FIR) filtering could be used. After filtering out transitions of low-frequency energy values, the remaining high-frequency energy is totaled or summed, preferably by a weighting function to provide a focal value which represents the relative focus of image data 37 received by image sensor 36.

Figure 3:
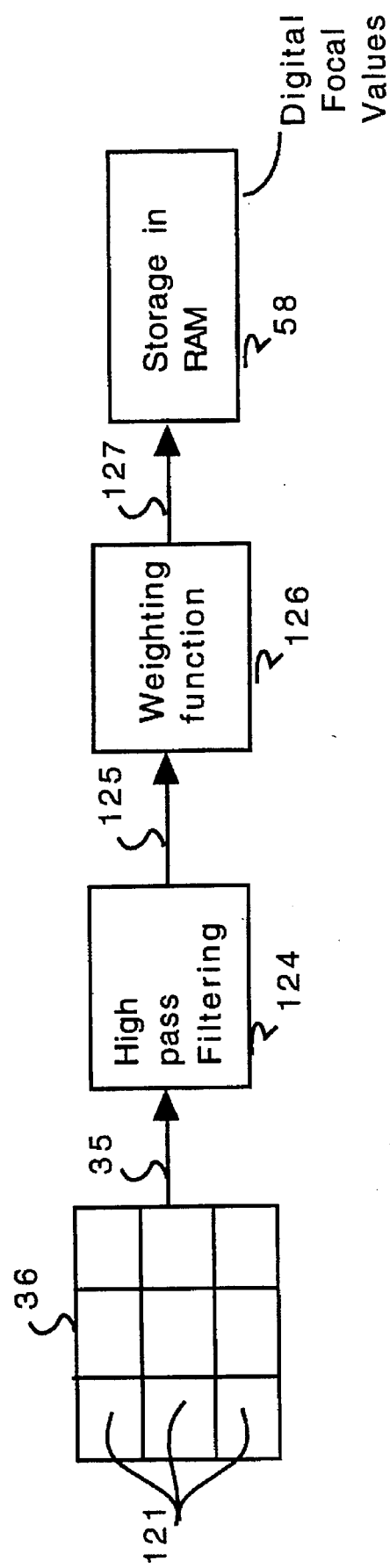
FIG. 3 is a block diagram illustrating the functional steps used in converting scanned CCD data collected from an image sensor to a digital focal value used to control engagement of the close-up lens.

FIG. 3 is a block diagram of steps for converting data from image sensor 36 into a digital focal value according to the present invention. Image sensor 36 collects and stores image data as an array of voltages within image sensor cells 121. For clarity, a greatly reduced number of cells 121 is shown in sensor 36. Each cell 121 contains an analog voltage corresponding to the intensity or magnitude of light incident upon that individual cell 121. Voltages stored within cells 121 are individually scanned and sequentially transmitted as a stream of analog voltages 35 to high-pass filter 124. In the preferred embodiment, these analog voltages 35 are converted through A/D converter 42 (FIG. 2) to digital signals and filtering is performed digitally by CPU 46. Alternatively, image data 37 may be processed using analog components and then transmitted as a series of analog voltages to high-pass filter 124.

Sharp transition regions between outputs of adjacent cells 121 of image sensor 36 can be accentuated by removing low-frequency constituents. The present invention exploits the tendency that unfocused image data from adjacent cells 121 exhibit small voltage changes, whereas focused image data from adjacent cells 121 exhibit larger voltage changes. Therefore, analog voltages 35 are filtered by high-pass filter 124 to remove low-frequency signal constituents of data samples showing little voltage variation, yielding filtered high-frequency CCD data 125 most relevant to image focus.

The high-pass filter 124 output of filtered CCD data 125 is processed by "weighting" function 126, which can use any of various types of conventional weighting methods. In its simplest form, weighting function 126 is a peak detector which identifies the magnitude of the largest high-frequency component of each pixel. Alternatively, weighting function 126 sums the peaks of all high-frequencies of filtered CCD data 125. Another alternative applies a conventional weighting function to filtered CCD data 125 to compensate for specific image characteristics caused, for example, by optical coatings used on fixed-focus lens 30. The weighting function may be applied to a subset of the pixels in the area of the image, for example, a circle in the center of the image. Following weighting function 126, the weighted data focal value 127 is transferred to RAM 58 for use in possibly automatically engaging and disengaging close-up lens 28.

Figure 4:
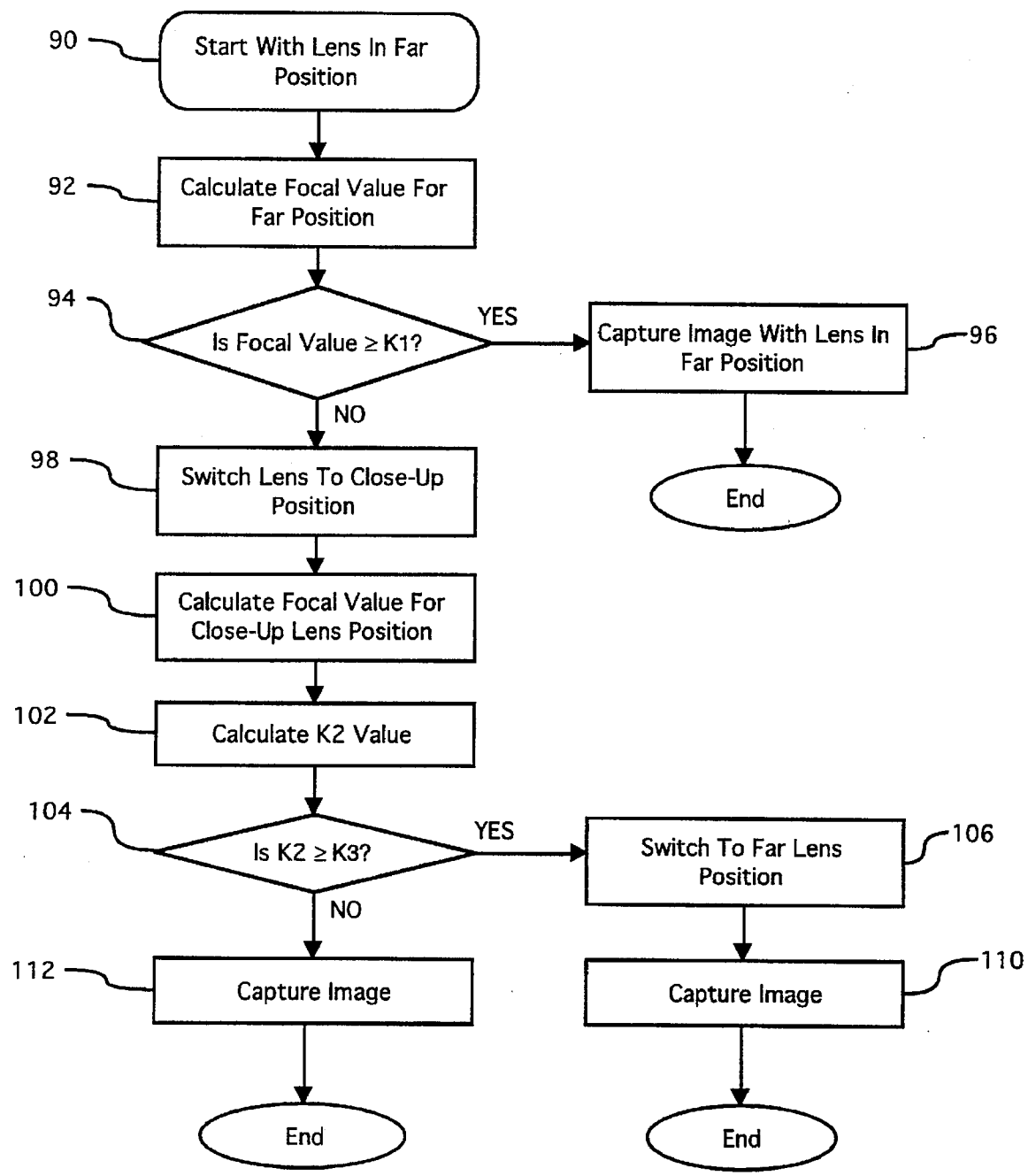
FIG. 4 is a flowchart showing process steps for automatically engaging and possibly disengaging a close-up lens in a fixed-focus camera to produce well-focused images.

FIG. 4 is a flowchart of process steps for automatically engaging and possibly disengaging a retractable close-up lens in a fixed-focus camera to produce well-focused images. In the preferred embodiment, the FIG. 4 process is initiated by depressing the camera's shutter release button to a middle position which then allows the present invention to select the correct lens. Selective use of the automatic engagement process prevents unnecessary battery drain where a close-up lens is clearly not appropriate.

Beginning the process in step 90, the lens assembly is in the disengaged far position, with retractable close-up lens 28 offset from optical axis 22. Step 92 uses the FIG. 3 procedure to calculate the focal value for the far position. Then, step 94 determines whether the calculated focal value is greater than or equal to K1, an empirically-derived threshold constant value for an image sufficiently well-focused that immediate capture is possible. If the calculated focal value is greater than or equal to K1, then the image is well-focused and the method in step 96 captures the image while leaving the lens assembly in the far position.

If the calculated focal value is less than K1, then step 98 switches the lens assembly into the close-up position. In the close-up position, retractable close-up lens 28 is in an engaged position coaxial with optical axis 22. Next, step 100 calculates the focal value for the close-up position again according to the FIG. 3 procedure. Then, step 102 calculates a value of K2, which is equal to the far-position focal value divided by the close-up position focal value. Next, step 104 tests whether K2 is greater than or equal to K3, where K3 is an empirically-derived constant value for determining whether to use the close-up position or to switch back to the far position. If K2 is greater than or equal to K3, then step 106 switches to the far position, and step 110 captures the image.

If K2 is not at least equal to K3, then step 112 captures the image with the lens assembly retained in the close-up position. When the camera user selects automatic lens engagement, the FIG. 4 procedure is repeated for each attempt to capture a different target image, thus assuring production of consistently well-focused images.

The invention has been explained above with reference to a preferred embodiment. Other embodiments will be apparent to those skilled in the art, in light of this disclosure. For example, the FIG. 3 processing circuitry could alternatively be implemented with either analog or digital components. Also, the invention could be extended to use more than one disengageable lens. Therefore, these and other variations upon and modifications to the preferred embodiment are intended to be encompassed by the present invention, which is limited only by the appended claims.

What is claimed is:

1. A camera comprising:

a close-up lens retractably disposed on an optical axis;

a fixed-focus lens disposed coaxially on the optical axis;

an image sensor disposed coaxially on the optical axis to receive image data and generate corresponding voltage signals; and a processor coupled to the image sensor for comparing high-frequency components of the voltage signals generated when the close-up lens is alternately on and retracted from the optical axis to determined a maximum focal value for the received image data.

2. The camera according to claim 1, further comprising retracting means for moving the close-up lens between an engaged position on the optical axis and a disengaged position not on the optical axis.

3. The camera according to claim 2, wherein the close-up lens is used in the one of the engaged position and the disengaged position which maximizes the focal value of the image data.

4. The camera according to claim 3, wherein the relative focal value of the image data is proportional to the magnitude of the summed high-frequency components.

5. The camera according to claim 1, wherein the image sensor is a charge-coupled device for converting the image data into analog voltage signals.

6. The camera according to claim 5, further comprising a high-pass filter for filtering the analog voltage signals generated by the charge-coupled device.

7. The camera according to claim 6 wherein the analog voltage signals from the charge-coupled device are filtered directly by the high-pass filter.

8. The camera according to claim 6, wherein the high-pass filter is a digital filter, and further comprising an analog-to-digital converter for converting the analog voltage signals into digital signals prior to high-pass filtering.

9. The camera according to claim 1, further comprising an infrared filter disposed on the optical axis between the fixed-focus lens and the image sensor to block infrared light from reaching the image sensor.

10. The camera according to claim 9, further comprising a low-pass filter disposed coaxially along the optical axis between the fixed-focus lens and the image sensor.

11. A camera comprising:

a retractable close-up lens and a fixed-focus lens aligned coaxially along an optical axis;.

optical-sensor means for receiving an image through said lenses and converting the image into voltage signals;

means for filtering the voltage signals to remove low-frequency components;

a peak detector for comparing high-frequency components remaining in the voltage signals to determine a maximum focus value for the image;

means for converting the voltage signals from the image sensor into digital signals prior to filtering; and means for moving the close-up lens between an engaged position coaxial with the optical axis and a disengaged position not coaxial with the optical axis to maximize the relative focal value of the image based on the measure high-frequency components.

12. A method for automatically engaging a close-up lens in a fixed-focus camera comprising the steps of:

receiving an image through a retractable close-up lens and a fixed-focus lens aligned coaxially along an optical axis;

using an image sensor aligned coaxially along the optical axis to convert the image to voltage signals;

filtering the voltage signals to remove low-frequency components; and comparing remaining high-frequency components of the voltage signals to generated when the close-up lens is alternately on and retracted from the optical axis to determine a maximum focal value for the image.

13. The method of claim 12, further comprising the steps of:

moving the close-up lens between an engaged position coaxial with the optical axis and a disengaged position not coaxial with the optical axis; and comparing the focal values for the engaged position and the disengaged position to determine a maximum focal value for the image.

14. The method of claim 13, further comprising the step of capturing the image with the close-up lens in the position corresponding to the maximum focal value.

15. The method of claim 13 wherein the step of moving the close-up lens uses an actuator controlled by a processor.

16. The method of claim 12 further comprising the step of converting the voltage signals from the image sensor into digital signals prior to filtering.

17. The method of claim 12, wherein the step of measuring the remaining high-frequency components uses a peak detector.

* * * * *